(12) United States Patent
Siegel (10) Patent No.: US 7,555,383 B2
(45) Date of Patent: Jun. 30, 2009

(54) TARGET ACQUISITION AND TRACKING SYSTEM

(75) Inventor: Neil Gilbert Siegel, Rancho Palos Verdes, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/446,475

(22) Filed: May 28, 2003

(65) Prior Publication Data

US 2005/0004759 A1 Jan. 6, 2005

(51) Int. Cl.
*G01C 21/26* (2006.01)
(52) U.S. Cl. .................. 701/207; 701/223; 342/357.07; 382/103
(58) Field of Classification Search .................. 701/1, 701/207, 213, 255, 3, 4, 120, 208, 300–302, 701/223, 17; 342/29, 80, 36, 179, 182, 183, 342/455, 27, 20, 90, 357.07; 340/961, 574, 340/573.1, 540; 89/1.11; 244/3.11, 3.16; 455/12.1; 382/103
See application file for complete search history.

(56) References Cited

U.S. PATENT DOCUMENTS

| | | | |
|---|---|---|---|
| 3,846,797 A | 11/1974 | Brown et al. | |
| 4,593,286 A * | 6/1986 | Mathews et al. | 342/88 |
| 4,622,458 A | 11/1986 | Boeck et al. | |
| 4,720,711 A * | 1/1988 | Quesinberry et al. | 342/96 |
| 4,949,089 A | 8/1990 | Ruszkowski et al. | |
| 5,130,715 A * | 7/1992 | Yanagisawa | 342/158 |
| 5,458,041 A * | 10/1995 | Sun et al. | 89/1.11 |
| 5,557,278 A | 9/1996 | Piccirillo et al. | |
| 5,714,948 A | 2/1998 | Farmakis et al. | |
| 6,064,333 A * | 5/2000 | Stromberg | 342/81 |
| 6,161,097 A | 12/2000 | Glass et al. | |
| 6,198,394 B1 * | 3/2001 | Jacobsen et al. | 340/573.1 |
| 6,314,361 B1 | 11/2001 | Yu et al. | |
| 6,404,380 B2 * | 6/2002 | Poore, Jr. | 342/96 |
| 6,448,929 B1 | 9/2002 | Smith et al. | |
| 6,469,660 B1 * | 10/2002 | Horvath et al. | 342/179 |
| 6,542,810 B2 | 4/2003 | Lai | |
| 6,584,879 B2 * | 7/2003 | Gorman | 89/1.11 |
| 7,092,924 B1 * | 8/2006 | Levedahl | 706/45 |
| 2001/0006372 A1 * | 7/2001 | Lemelson et al. | 342/45 |

(Continued)

OTHER PUBLICATIONS (Vikram Krishnamurthy) algorithms for optimal scheduling and management of hidden Markov Model sensors, IEEE trans on signal processing, vol. 50, No. 6, Jun. 2002.*

(Continued)

*Primary Examiner*—Khoi H. Tran
*Assistant Examiner*—Ronnie Mancho
(74) *Attorney, Agent, or Firm*—Tarolli, Sundheim, Covell & Tummino LLP (57) ABSTRACT

Systems and methods are provided for identifying one or more targets of interest, and scheduling the tracking of at least one such target of interest employing one or more remote sensing/tracking systems. A target finder finds, describes, and provides a report concerning targets of potential interest. A target selector selects at least one target of interest from a plurality of identified targets. A plurality of remote sensing/tracking systems are operative to track the at least one target of interest. A tracking control system schedules at least one of the remote sensing/tracking systems to track the at least one target of interest based on at least one tracking parameter.

19 Claims, 8 Drawing Sheets

U.S. PATENT DOCUMENTS

2003/0019350 A1* 1/2003 Khosla ................ 89/1.11
2003/0093187 A1* 5/2003 Walker ................ 701/1
2006/0238406 A1* 10/2006 Nohara et al. ................ 342/90

OTHER PUBLICATIONS

Node selection for target tracking unig Bearing Measurements from unattended ground sensors (Lance M. Kaplan), IEEEAC paper # 1332.*

Particle Filtering for Multi-target Tracking and sensor management (Arnaud Doucet, ISIF 2002.*

Auction Algorithm paper from Wikipedia.*

Search Report Under Section 17 in the United Kingdom dated Aug. 3, 2004, for Great Britain Patent Application No. GB0406402.8, filed Mar. 22, 2004, claiming priority from the instant application.

* cited by examiner

TARGET ACQUISITION AND TRACKING SYSTEM

TECHNICAL FIELD

The present invention relates generally to information systems, and more particularly to a target acquisition and tracking system.

BACKGROUND OF THE INVENTION

Modern technology has made it possible for large amounts of information to be gathered from surveillance of a given area of interest. Advances in computers, position-reporting devices, digital communications, and short-range sensors (e.g., laser-range finders, etc.) have made it possible for personnel within the area of interest to provide accurate information concerning the identity and location of an encountered surveillance targets nearly instantaneously. Such short-range sensors, however, generally have difficulty tracking a target. That is a short range sensor, at the time of initial observation, will observe and accurately determine and report a target's location, but is generally ineffective and/or inefficient at continuously updating the location of a moving target as time progresses (i.e., "tracking a target"). This is because the short range sensor has a limited range, which forces it to follow the selected target to the neglect of other assignments. Additionally, following or getting too near a target may be undesirable for other reasons (e.g., would prevent remaining concealed).

Meanwhile, wide-range sensors can be mounted to high-altitude aircraft or orbital satellites to provide a comprehensive view of the area. These sensors can provide continuous updating of a target's position, but generally, view so many targets that it is not always easy to discern which targets are of interest, or easily identify targets (e.g., friend or foe or neutral; type of vehicle; etc.). Furthermore, it is difficult for wide-range sensors to determine a particular function of a target (e.g., enemy reconnaissance team, enemy re-supply team, etc.).

Under the prior state of the art, extraction of useful information from these varying sources has been a difficult process. Different bodies of sensors worked independently, making it difficult to match target data from short-range sensor sources to data from the long-range sensors without significant human intervention. This intervention adds to the expense of collecting data, introduces the possibility of human error, and, most importantly, significantly delays the interpretation and enhancement of the collected data. Since the position of an identified target will change with the period of this delay, it can be difficult to determine the present position of an interesting target once its significance is realized.

The tracking task is further complicated when tracking an uncooperative target. In many tracking applications, a target can cooperate with the tracking systems. For example, in a typical air traffic control application, tracked aircraft will file a flight plan detailing an intended path of flight. Confirmation of the aircraft's identity is provided each time the control system contacts the plane. In other applications, however, the target cannot or will not cooperate with the tracking system. For example, in military and surveillance applications, the target will clearly not be willing to aid in the tracking efforts. Similarly, the target may not have the communications capacity necessary to report its position and identity to a tracking system. When a target's identity cannot be easily confirmed, a target can easily be confused with other targets when the responsibility for tracking the target is passed between tracking systems or the target enters a crowd of other, less interesting targets. Furthermore, the approximate path of the target is not known, making it difficult to determine which tracking system will be responsible for the target.

When dealing with these situations in the past, it has been the duty of human operators to determine meaning from provided location data. The various short-range target sightings are analyzed by a staff of individuals, and remote sensing/tracking resources are allocated to track targets on an ad hoc basis. Amongst other problems, the decision-making staff is faced with the problem of optimizing the allocation of remote sensing/tracking devices to candidate targets, which is complicated because the differing physics bases of the various remote sensing/tracking devices makes each device more or less effective at collecting particular phenomena. Additionally, the number of targets to follow generally significantly exceeds the number of remote sensing/tracking devices available, so multiple targets are assigned to a single remote sensing/tracking system. As the numbers of tracking systems and targets increase, such determinations become increasingly difficult.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later.

The present invention relates to systems and methods for tracking one or more targets of interest. A target finder (e.g., a human target finder) finds, describes, and provides a report concerning targets of potential interest. A target selector (e.g., a human target selector) selects at least one target of interest from a plurality of identified targets. A plurality of remote sensing/tracking systems are operative to track the at least one target of interest. A tracking control system schedules at least one of the remote sensing/tracking systems to track the at least one target of interest based on at least one tracking parameter. Using the information from the target selector as a "track initiate", the remote sensing/tracking systems can find the target(s) of interest out of the (potentially) very large number of observable objects. Using the information (e.g., a record index key identifier) contained in the initial report from the human target finder, information concerning the target(s) that are tracked are reported back to the requestor in a form suitable for immediate use, without requiring extensive pre-processing or exploitation.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF INVENTION

The present invention relates to systems and methods for tracking one or more targets of interest (referred herein as the term "closed-loop tracking" of one or more targets of interest). A target finder (e.g., human target finder) finds, describes, and provides a report concerning targets of potential interest. A target selector (e.g., human target selector) selects at least one target of interest from a plurality of identified targets. A plurality of remote sensing/tracking systems are operative to track the at least one target of interest. A tracking control system schedules at least one of the remote sensing/tracking systems to track the at least one target of interest based on at least one tracking parameter. Using the information from the target selector as a "track initiate", the remote sensing/tracking systems can find the target(s) of interest out of the (potentially) very large number of observable objects. Using the information (e.g., a record index key identifier) contained in the initial report from the human target finder, information concerning the target(s) that are tracked are reported back to the requestor in a form suitable for immediate use, without requiring extensive pre-processing or exploitation.

Figure 1:
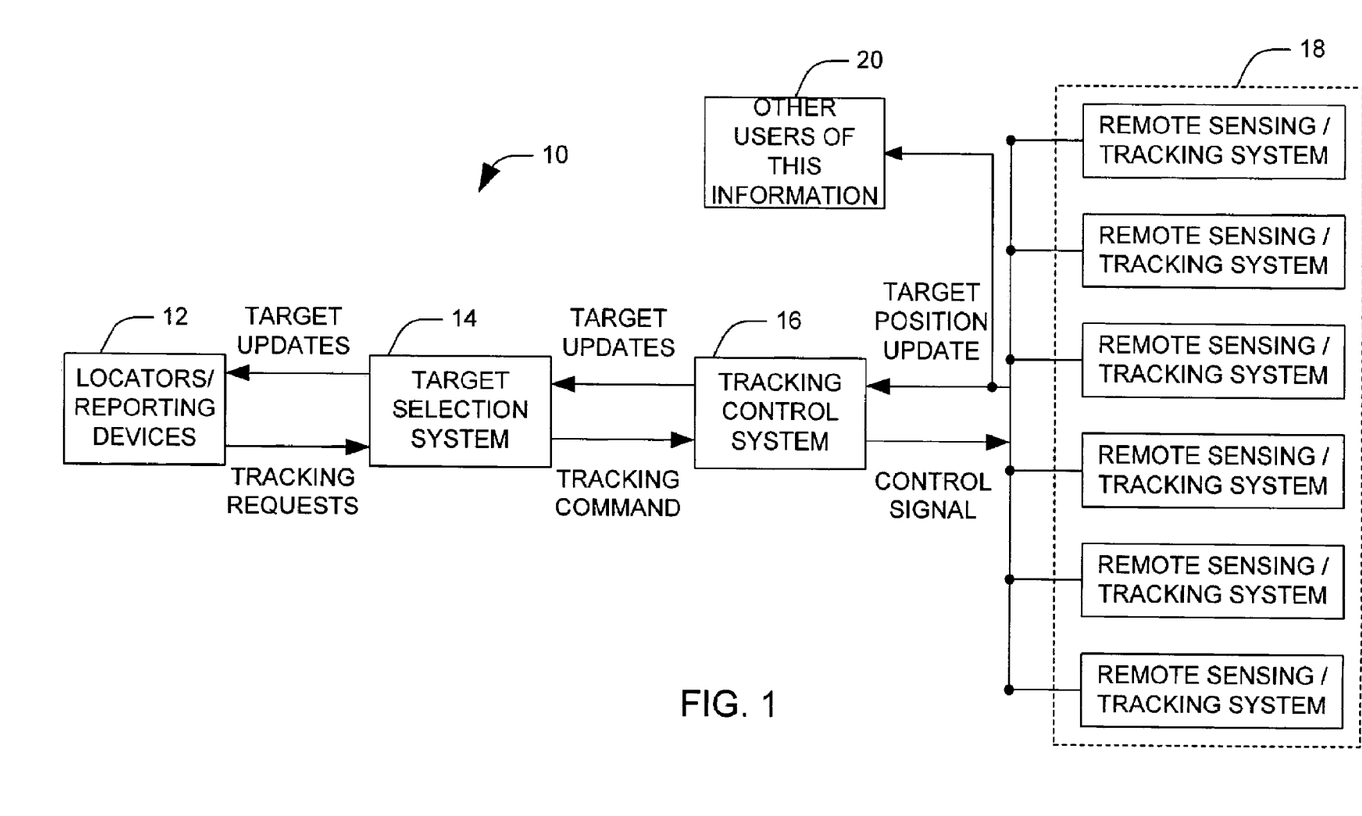
FIG. 1 illustrates a functional block diagram of a closed loop tracking system in accordance with an aspect of the present invention.

FIG. 1 illustrates a closed loop tracking system 10 in accordance with one aspect of the present invention. The system 10 includes one or more human locators employing respective locator/reporting devices 12. Each human locator uses their judgement and training to determine if an observed object is a potential target of interest, and if so, to determine its identity and function. The identity and function of the target of interest is then reported via a respective locator/reporting device 12. The reporting device facilitates a determination of the location of the potential target, assigns a unique record index key identifier, and prepares/transmits a target report. The target report can include data relating to the target, such as identity of the target and general importance of the target. This data can be generated by one or more pattern recognition classifiers, or it can be provided by the human operator of the device. The unique record index key identifier and other consolidated information is subsequently passed to a target selection system 14.

The target selection system 14 receives a plurality of target reports from the one or more locator/reporting devices 12. The target selection system 14 selects a set of targets of particular interest, for which it will request further surveillance. The target selection system 14 can be fully automated, selecting its targets via one or more expert systems, or the functions of the target selection system may be divided between automated systems and a human operator. For each selected target, a tracking request is generated and sent to a tracking control system 16.

The tracking control system 16 assigns tracking requests to a plurality of remote sensing/tracking systems 18 (e.g., all of which can be mobile, have predetermined paths of travel), and controls exchanges of tracking assignments between the sensors. For a given tracking request, the tracking control system 16 determines an optimal tracking schedule amongst the plurality of remote sensing/tracking systems 18 for the specific target.

For example, the tracking control system 16 can determine that a first remote sensing/tracking system can track the target for a short interval, while a second remote sensing/tracking system moves into a position within a tracking range of the target. At the end of the determined interval, the first remote sensing/tracking system can hand-off tracking of the target to the second remote sensing/tracking system, which can continue the tracking until it moves out of range, and so forth. The scheduling determination can take into consideration characteristics of the remote sensing/tracking systems 18, such as the range of a given remote sensing/tracking systems, its position relative to the target, the suitability of the physics basis for the remote sensor to observe the target given the phenomenology displayed by the target, the target's velocity, and the capacity of the remote sensing/tracking system that is unused, or that could be diverted at the present time schedule.

For example, it will be appreciated that the one or more of the remote sensing/tracking systems can have an associated path of motion independent of the target position. For example, a remote sensing/tracking system can include an airplane having one or more types of sensors mounted thereon. This airplane can have a predefined flight path necessary to scan an area of ground with its sensor. The scheduling determination at the tracking control system can take into account this predefined flight path, and assign the remote sensing/tracking system to track an assigned target only for as long as the airplane is scheduled to be within range of the target. After this time, the tracking system can hand-off the assigned target to another remote sensing/tracking system expected to move within range of the target, or to a remote sensing/tracking system having a more flexible plan of motion.

Once a remote sensing/tracking system is scheduled to track a specified target, it will track the target for the specified time unless the target leaves its tracking range or a superceding command is received. Upon such an event, the remote sensing/tracking system notifies the tracking control system 16 that it has ceased to track the target. If the target control system 16 determines that the target is still an active target, it once again determines an optimal tracking schedule for the target, and re-assigns the target to the newly scheduled remote sensing/tracking systems, or notifies the target selection system that it is unable to track the target at this time.

The remote sensing/tracking systems 18 determine the position of a specified target at regular intervals (e.g., ten seconds), which may vary from one remote sensing/tracking system to another, and also vary over time for any particular remote sensing/tracking system. For each new determination, the remote sensing/tracking systems 18 produce a target update containing the updated position of the target, and other observables that can be measured by this remote sensing/tracking system. This update can be disseminated to the tracking control system 16, the target selection system 14, the one or more locator devices 12, and a plurality of other users 20, in order to update target position information at these locations.

Figure 2:
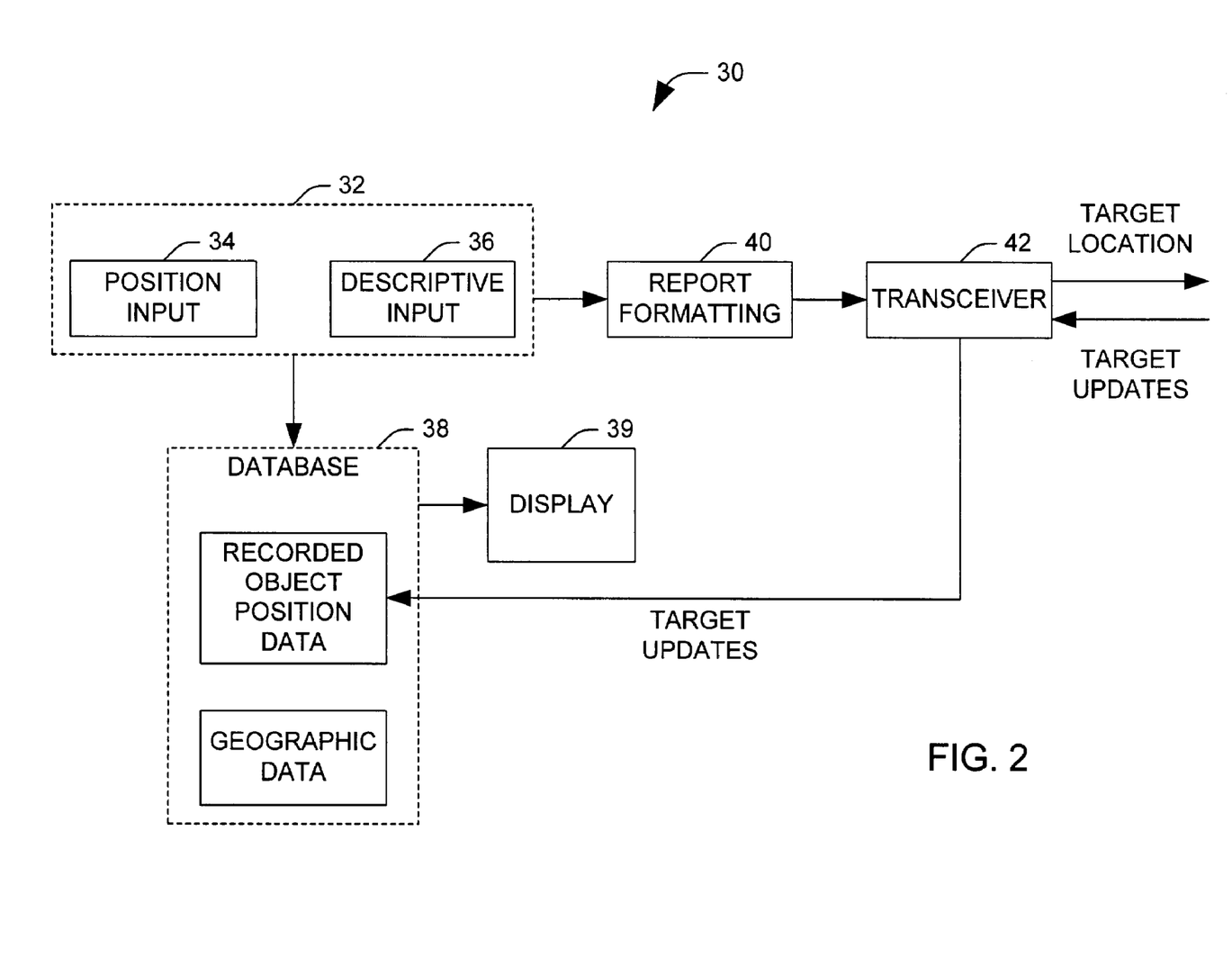
FIG. 2 illustrates a functional block diagram of an exemplary locator device in accordance with an aspect of the present invention.

FIG. 2 illustrates a functional block diagram of an exemplary locator/reporting device 30 in accordance with an aspect of the present invention. Upon encountering a potential target, the locator device 30 gathers information about the target through one or more input devices 32. In the illustrated example, two input devices are illustrated, a position input 34 and a descriptive input 36, but it will be appreciated that the particular inputs available to the device 30 will vary with the application. The positioning input 34 determines an exact location of the target. In one implementation of the invention, the position input 34 includes a Global Positioning System (GPS) that determines the exact location of the locator device 30, and a laser rangefinder that determines the direction of the target and its distance from the locator device 30. It will be appreciated that other methods of determining the position of the target may be employed by the position input 34, such as human estimation, short range radar, or image analysis by an expert system.

The descriptive input 36 gathers data concerning other characteristics of the target. For example, the identity of the target (e.g., a group of 3 T-72 tanks), the function it appears to be performing (e.g., enemy combat reconnaissance patrol), its condition (e.g., damaged or undamaged, etc.), its state (e.g., appears to be fully armed, etc.), and its relative importance may be determined and provided to the locator device 30. In an exemplary implementation, the descriptive input 36 can comprise a computer keyboard or touchscreen on which a trained operator enters his or her observations on the target. Alternatively, the descriptive input 36 can comprise an imaging sensor and one or more expert systems that identify predetermined characteristics of the target. In an exemplary implementation of the invention, the descriptive input 36 provides a parameter describing the importance (e.g., tracking priority) of the located target.

The data from the one or more input devices 32 are provided to a database 38. The database 38 contains information on previously located objects, geographic information concerning the area of interest, information regarding orders from higher authority, and other relevant information (e.g., summaries of known enemy intent, reports of contaminated areas, bridge outages, etc.). Information from the database can be displayed at a display 39 operatively connected to the database. The display 39 can be a touchscreen display, or an alternate input device (not shown) can be provided for accessing the information. The previously located objects stored in the database 38 can include the position of targets identified by the locator device 30, the position of targets located by other locator devices, updated location data for tracked targets, the position of other components of the closed-loop tracking system, and other geographic and non-geographic information. The database is periodically updated through transmissions received at a transceiver 42.

The data from the one or more input devices are also provided to a report formatter 40. The report formatter 40 collects the input data into a format compatible with other components of the closed loop system, and assigns it a unique report ID to form a location report. The unique ID is also stored in the local database. The location report is provided to the transceiver 42, and broadcast to the target selector and other users. In an exemplary implementation, the location report comprises multicast updates to one or more other components of the closed-loop system (e.g., the other locator devices, and other users of the data).

Figure 3:
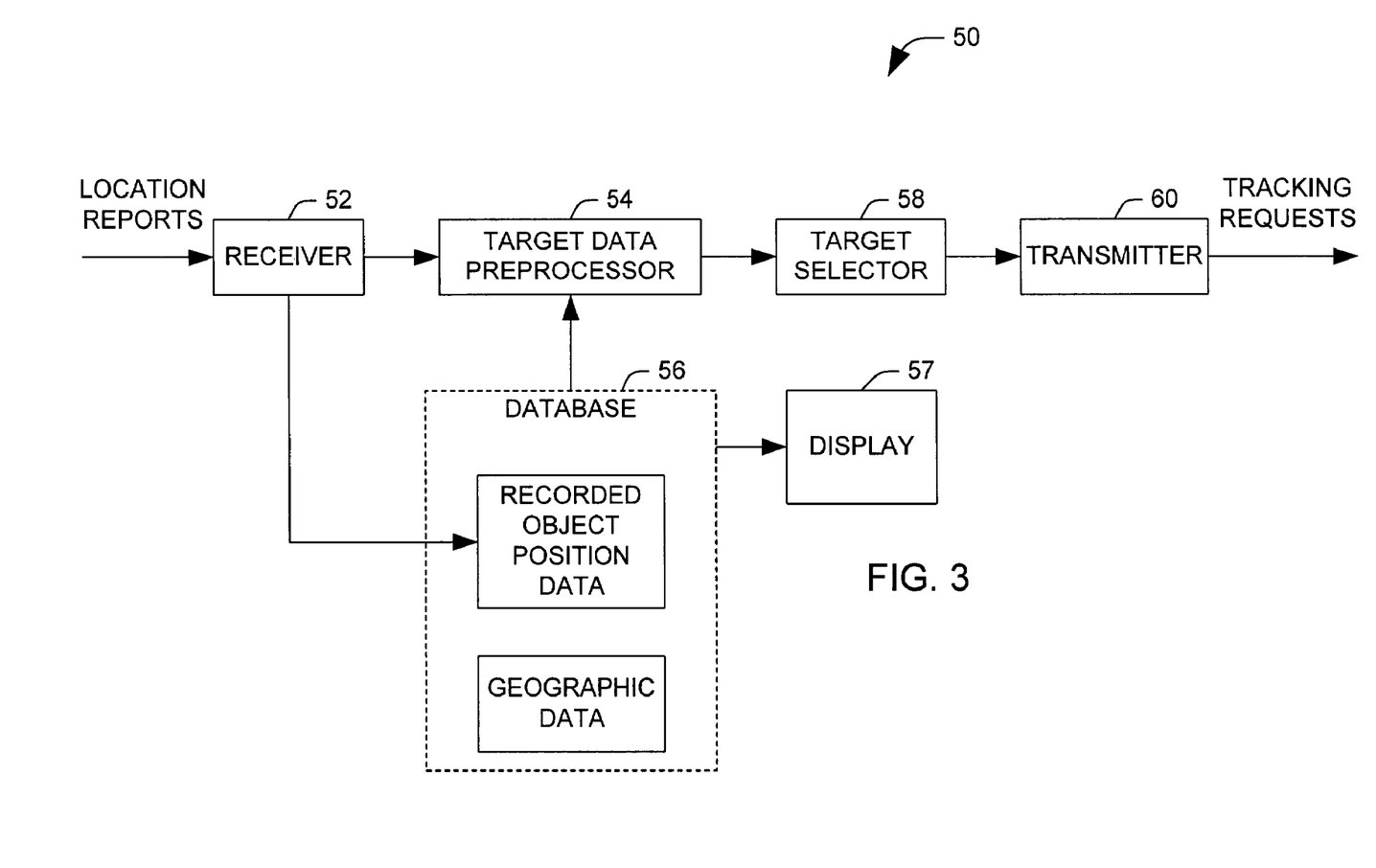
FIG. 3 illustrates a functional block diagram of an exemplary target selection system in accordance with an aspect of the present invention.

FIG. 3 illustrates a functional block diagram of an exemplary target selection system 50 in accordance with an aspect of the present invention. The target selection system 50 receives a plurality of location reports at a receiver 52. The received reports are processed at a target data preprocessor 54 to facilitate the selection of a set of targets of interest. The preprocessing of the reports can include formatting the reports for an associated display, geographic or other filtering, prescreening of the reports by an expert system, or any other function that serves to organize and simplify the data.

The position report information is also provided to a database 56. This database will contain object position data and geographic data similar to that of the reporting/location devices. In an exemplary implementation, the contents of the databases will be nearly identical, as both the reporting/location devices and the target selection system 50 will be receiving roughly the same multicast location reports. Access to the information from the database can be gained by a human operator at a display 57 operatively connected to the database. The display 57 can be a touchscreen display, or an alternate input device (not shown) can be provided for gaining access to the information. The location reports within the target data preprocessor may be augmented by data within the database 56. For example, a target's position with respect to one or more objects (e.g., range and bearing) within the database may be included with the report. The preprocessed location reports are then provided to a target selector 58.

The target selector 58 selects a set of targets of interest from the preprocessed target reports for which to request further surveillance. This selection can be based upon any number of characteristics of the target report, and the specific characteristics of interest will vary with the application. For example, where the target is a vehicle, the type of vehicle and its proximity to other vehicles can factor into the target selection. In an exemplary implementation, one of the considered factors can be an importance parameter produced at the reporting/locator device. The target selector 58 can comprise any system capable of intelligently discriminating between targets according to the selected factors. For example, the target selector 58 can comprise an input device and display controlled by a human operator. Alternatively, target selection can comprise one or more trained expert systems that select targets according to a number of predefined characteristics.

It will be appreciated that the selected target set can include any number of targets, including a set with only one target, or an empty target set. For ease of explanation, it will be assumed hereinafter that at least one target has been selected. After the targets are selected, the selected target set is provided to a transmitter 60 for transmission to a tracking control system as a set of tracking requests.

Figure 4:
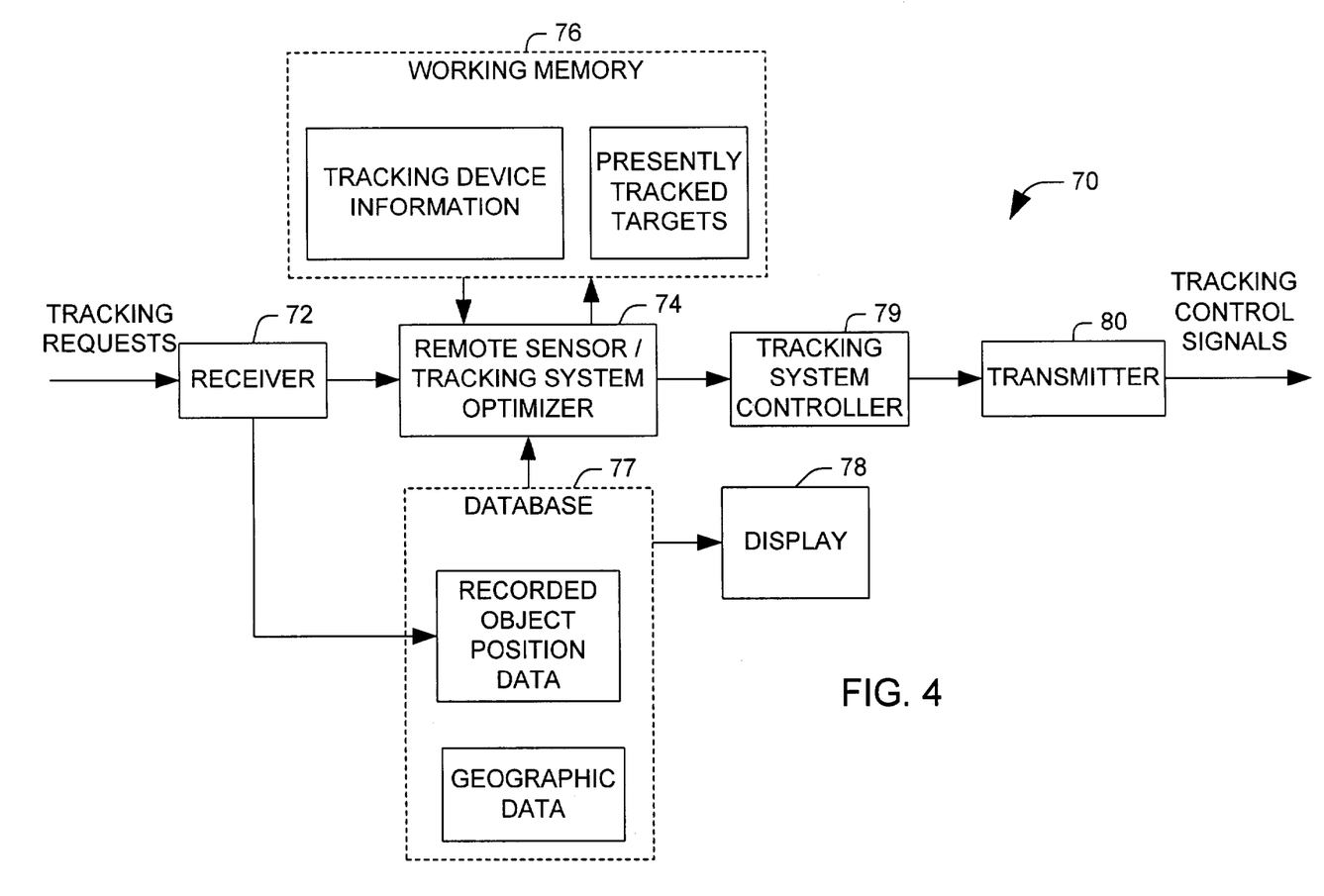
FIG. 4 illustrates a functional block diagram of an exemplary tracking control system in accordance with an aspect of the present invention.

FIG. 4 illustrates a functional block diagram of an exemplary tracking control system 70 in accordance with an aspect of the present invention. The tracking control system 70 receives the set of tracking requests at a receiver 72. The target selection system 70 assigns remote sensing/tracking system resources to produce periodic position updates for the requested targets. The tracking requests are provided to a remote sensing/tracking system optimizer 74 that optimizes the use of resources within the mobile tracking systems.

The remote sensing/tracking system optimizer 74 creates a schedule of tracking system resources to track the selected targets. The remote sensing/tracking system optimizer 74 determines an optimal schedule for each sensor according to an optimization algorithm. This can be accomplished via evolutionary algorithms, least cost path techniques, or any other suitable method. In an exemplary implementation, an auction algorithm is used to determine optimal tracking schedules for the selected targets. It will be appreciated that remote sensing/tracking systems can have the capacity to track multiple targets simultaneously, and independently to acquire and discard targets while maintain tracks on other targets.

The remote sensing/tracking system optimizer 74 is operatively connected to a working memory 76 containing data regarding the various remote sensing/tracking systems and the targets presently being tracked. The remote sensing/tracking system data can include the position of the remote sensing/tracking system, the range of its sensors, any scheduled change in its position, and its present unused tracking capacity. The tracking control system 70 can also include a database 77, containing data similar to that described within the reporting/location devices. This database 77 can be updated by multicast position updates received at the receiver 72. Access to the information from the database can be gained by a human operator at a display 78 operatively connected to the database. The display 78 can be a touchscreen display or an input device (not shown) can be provided for gaining access to the information. Pertinent information that is present in the database 77 and the working memory 76 will be taken into account in the optimization process.

A determined optimal tracking schedule associated with a respective request is provided to a tracking system controller 79. The tracking system controller 79 generates control signals for the remote sensing/tracking systems based upon the determinations of the tracking system optimizer 74. Each control signal directs the remote sensing/tracking device to track the associated target from a given start time to a given termination time, while it is within a specified geographic area, or other method of specifying the bounds of the tracking period. In an exemplary implementation, the control signal can further include a request that the remote sensing/tracking system change its path of movement facilitate tracking of the one or more selected targets. These control signals are then provided to a transmitter 80, which transmits the control signals to the appropriate remote sensing/tracking systems.

Figure 5:
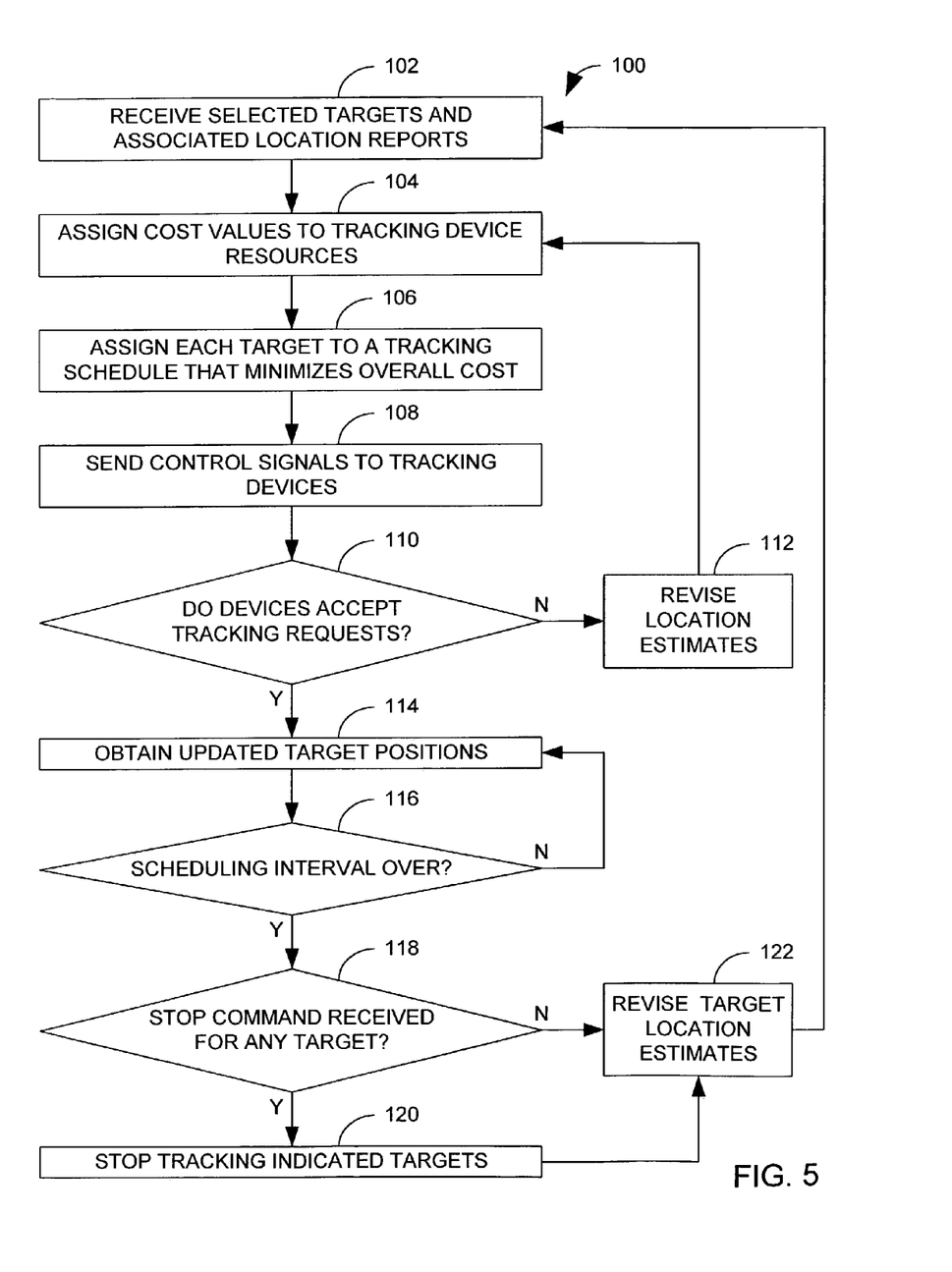
FIG. 5 illustrates an exemplary methodology for providing an optimal schedule of tracking system resources to the selected targets in accordance with an aspect of the present invention.

FIG. 5 illustrates an exemplary methodology 100 for providing an optimal assignment of remote sensing/tracking system resources to the selected targets. It will be appreciated that a single remote sensing/tracking system can include the capability to track a plurality of targets. Thus, the tracking system resources that are assigned can be associated with one or more different remote sensing/tracking systems.

The methodology begins at 102, where the tracking control system receives a location report concerning the target of interest. The location report will contain a location of the target at one point in time, the identity of the target, and (in some but not all cases) an approximate heading and velocity of the target. At 104, the tracking control system determines the "cost" values associated with each of the plurality of tracking system resources (the term "cost" herein is being used to indicate factors affecting the desirability or non-desirability of an action, not exclusively financial cost). The calculated "cost" factors represent contributions from a variety of factors. These factors will vary with the implementation of the tracking control system and the application to which it is applied.

In an exemplary implementation, one factor will be the probability that the target is within sensing range and the field of view of the remote sensing/tracking system. Even in the closed-loop tracking system of the present invention, there will be a period of delay between the generation of a location report and the arrival of the report at the tracking control system. The exact position of the target can only be estimated from the prior position and velocity at the time the location report is received. The ability of a remote sensing/tracking system to track a selected object can thus be expressed as a probability, and any deviation of that probability from certainty can be factored into the "cost" of using resources of that remote sensing/tracking system.

The capacity of the remote sensing/tracking system can also be taken into account, such that remote sensing/tracking systems having a greater amount of unused tracking capacity will be preferred to those nearing the limits of their capabilities. This can be expressed as an increased "cost" value for resources, as resources within a particular remote sensing/tracking system are assigned. A further factor can include the duration over which a device could track the target, with short duration tracking assignments being discouraged. This factor would serve to limit the number of hand-offs, reducing the possibility of misidentifying the target while transferring it between tracking systems.

The methodology continues at 106, where the tracking control system assigns each target to an optimal tracking schedule of hand-offs between tracking systems. This is accomplished via an optimization algorithm that minimizes the overall cost value for the selected targets. In an exemplary implementation, an auction algorithm is used to assign the targets to the various tracking system resources, but it will be appreciated that other optimization algorithms, such as genetic algorithms, branch and bound, and simulated annealing, can also be used within the scope of the claimed invention.

The tracking schedule is designed to cover a single scheduling interval, reflecting a period of time after which the system will revise the cost value determinations with updated information on the position, velocity, and heading of the target. The specific scheduling interval will vary with the application, but, in general, the scheduling interval can be selected to allow for an estimate of the target's position at the end of the interval that is sufficiently accurate to assign an effective tracking schedule. At the end of each scheduling interval, the system receives an updated target position and reschedules the targets to the tracking system resources.

The methodology continues at 108, where the tracking control device sends control signals to each of the scheduled remote sensing/tracking systems. The control signals contain information concerning the position, and possibly, the velocity and heading of the selected targets from their location reports, as well as a request for the device to track the target for the scheduled duration/geographic extent. In an exemplary implementation, the control signal can also contain a request for the tracking system to deviate from its present flight path better to track a selected target.

At 110, the remote sensing/tracking systems respond to the control signal to accept or reject the tracking request. For example, a tracking system might reject a tracking request when it cannot find the target it has been requested to track. This can be the result of a mis-estimation of the target's position, a deviation in the remote sensing/tracking system's position from its estimated plan of motion, masking of the target during the time interval since it was originally sighted, or a mis-identification of the target at the remote sensing/tracking system.

Where one or more remote sensing/tracking systems reject the tracking request, the methodology proceeds to 112, where the location estimate for the target is revised. In an exemplary embodiment, feedback from the remote sensing/tracking systems allows estimated locations for the remote sensing/tracking systems to be updated as well. In some applications, however, such feedback can be technically impracticable or otherwise undesirable, requiring the tracking control system to rely primarily on a predetermined plan of motion for the remote sensing/tracking systems to estimate their location. The methodology then returns to 104 to determine new "cost" values for the system resources under the revised estimations.

Where all remote sensing/tracking systems accept the tracking requests, the methodology proceeds to 114, where the remote sensing/tracking systems provide updated target positions to the tracking control system. These updates can coincide with the end of a scheduling interval, or can be received more frequently. The methodology continues at 116, where it is determined if the scheduling interval has ended. If not, the methodology loops back to 114 to update the target position again, according to the scanning rate of the tracking system.

When the scheduling interval ends, the methodology continues to 118, where the tracking control system determines if it has received a command to stop tracking a particular target. In an exemplary implementation, stop commands are issued by the target selection system and indicate that a particular target is either no longer of interest, or that it has been superceded by a higher priority target.

Where a stop command has been received, the methodology proceeds to 120, where the remote sensing/tracking systems are instructed to stop tracking the indicated target(s). The methodology then proceeds to 122. Where no stop command is received, the methodology bypasses 120 to proceed directly to 122. At 122, the estimated positions of the remaining (i.e., not indicated in a stop command) tracked targets are revised to reflect the information provided by the tracking systems. The methodology then returns to 102 to receive new targets, and begin a scheduling process for the next scheduling interval.

The remote sensing/tracking systems need to have the ability to receive (in a suitable electronic format) the control signals and target data (inclusive of the unique identifier provided to the remote sensing/tracking system by the tracking control system) from the tracking control system, as describe above. Additionally, the remote sensing/tracking systems need to have the ability to track (using any number of different phenomenologies) the targets described in the request from the tracking control system, and also have the ability to send information back as described above back to the tracking control system (e.g., notification that the remote sensing/tracking is accepted or rejecting the tracking request via the actual track-update message, inclusive of the unique identifier provided to the remote sensing/tracking system by the tracking control system; and other administrative and management information as previously described).

It is to be appreciated that the various functions of the exemplary remote sensing/tracking system can be contained within a single unit, such as an airplane, or distributed between multiple units, such as a spacecraft and an associated ground station. It will be further appreciated that the remote sensing/tracking system can employ any of a variety (or multiple) physics/phenomenology methods (e.g., optical/imagery, moving tracking radar, synthetic aperture radar, passive radio frequency emission monitoring (e.g., signals intelligence, etc.), acoustic, or other basis).

Figure 6:
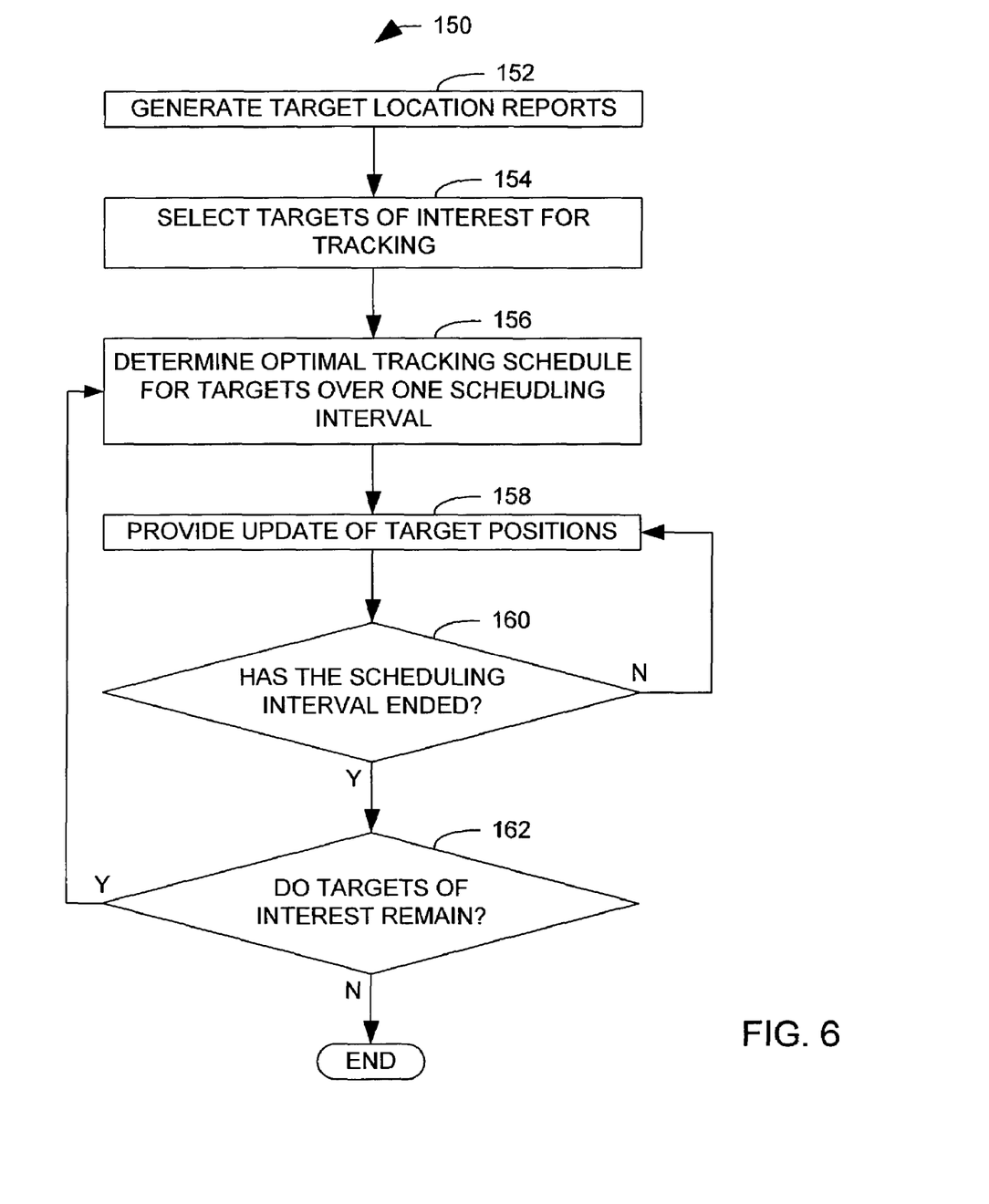
FIG. 6 illustrates an exemplary methodology for identifying and tracking a target of interest in accordance with an aspect of the present invention.

FIG. 6 illustrates an exemplary methodology 150 for identifying and tracking a target of interest in accordance with an aspect of the present invention. The methodology begins at 152, where one or more reporting/locator devices determine the existence and location of potential targets of interest, and prepare a plurality of target reports. Target reports will provide at least an estimated location of the target, and can provide other data relating to the target, such as the identity, assessment of functional purpose and role, velocity, heading, and general importance of the target.

The methodology continues at 154 where a set of targets of interest is selected from the plurality of target reports. The targets can be selected on the basis of characteristics of the target, such as its location relative to points of interest, its identity (e.g., type of vehicle), the general importance as specified in the location report, and a sense of the maximum number of targets the users wish to have tracked simultaneously. The target selection function can be divided between one or more expert systems and a human operator. In an exemplary implementation of the methodology, the target reports are preprocessed by an expert system to format and simplify the location reports for selection by a human operator.

At 156, an optimal tracking schedule is determined for the selected targets among the plurality of mobile tracking systems. Each schedule defines a series of remote sensing/tracking systems to track a target for a predetermined scheduling interval according to an optimization routine. Any suitable optimization routine can be used in this portion, such as evolutionary algorithms, auction algorithms, and branch and bound processes. The scheduling determination can take into consideration characteristics of the tracking systems, including the range of each remote sensing/system, the positions of the remote sensing/systems relative to the target, and the respective unused tracking capabilities of each system.

The remote sensing/tracking systems determine the present location of their assigned targets from the information given in the location reports and track the selected targets according to the determined schedule. A target can be tracked by any reasonable method of determining the position of a moving object at a distance. In an exemplary embodiment, a target can be tracked by radar, detection of RF emissions, or by imaging within the visible light spectrum. One skilled in the art will appreciate that other methods of tracking can be applied within the present invention.

At 158, the mobile tracking systems provide updates of the target positions to at least one other component of the closed loop tracking system. In an exemplary embodiment, the updates are provided as radio frequency broadcast signals, but any suitable means of communicating the updated target location information may be used. The updates are generally provided to the tracking control system for the purposes of later schedule determinations, but they can also be provided to the target selector or the locator devices as well.

At 160, it is determined if the scheduling interval has ended. If it has not, the methodology returns to 158 to provide another set of target position updates. When the scheduling interval ends, the methodology advances to 152. At 162, it is determined if targets of interest remain for tracking. If so, the methodology returns to 156 to establish a new tracking schedule for the targets remaining from the previous schedule and any new targets of interest that have been identified. If no targets of interest remain, including newly selected targets, the methodology ends.

Figure 7:
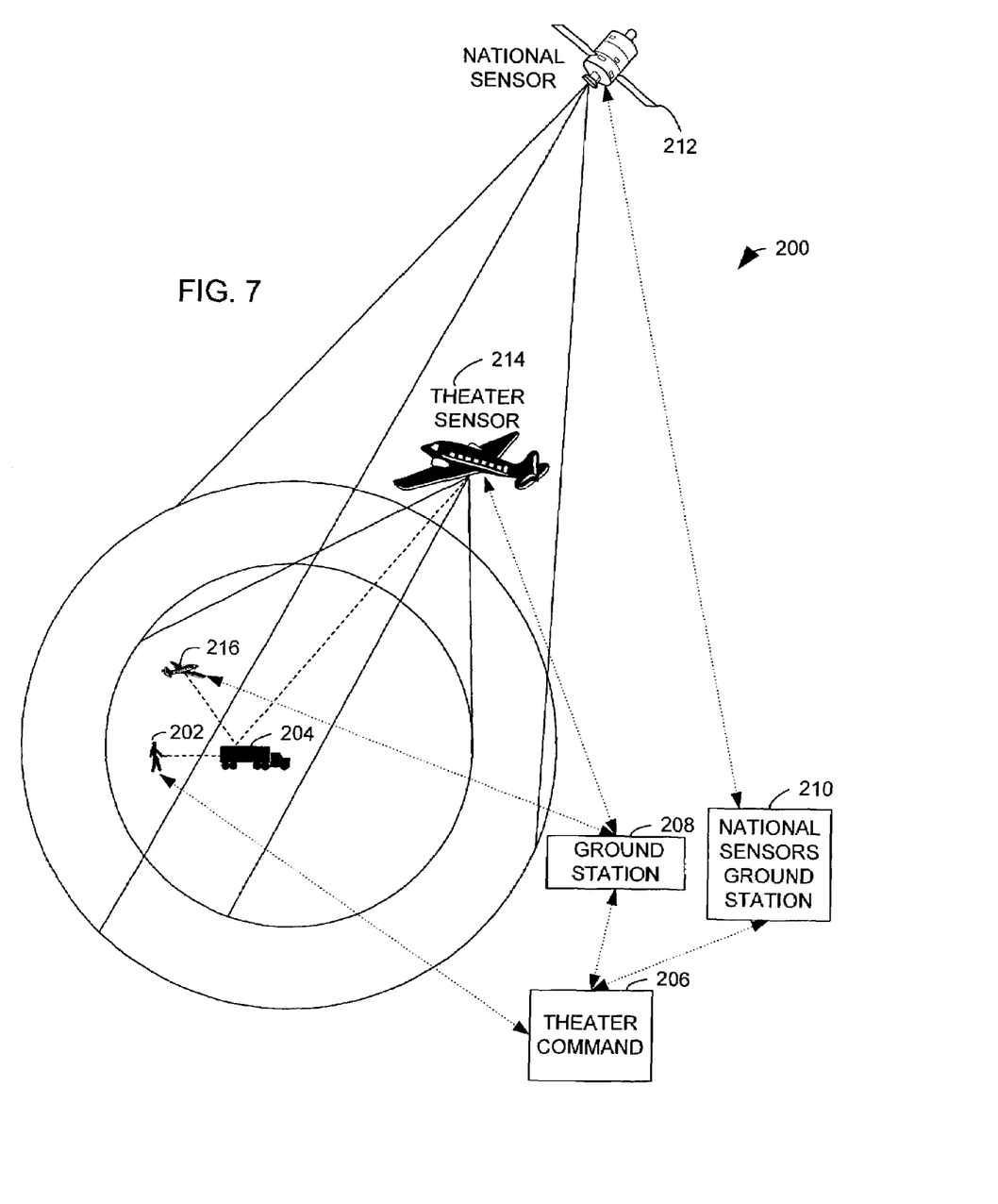
FIG. 7 illustrates an exemplary closed loop tracking system in accordance with one aspect of the present invention.

FIG. 7 illustrates an exemplary closed-loop tracking system 200 in accordance with one aspect of the present invention. The system 200 is illustrated as part of a battlefield communications system in a military theater of operations. It will be appreciated that the closed-loop tracking system of the present invention is not limited to military applications, and may be used, for example, in civilian search and rescue operations, air traffic control, and telecommunications applications.

FIG. 7 illustrates a soldier 202 determining the position of an enemy target 204. This determination can be an estimate of the position of the enemy target 204, or can be made with a laser rangefinder or a similar distance-bearing-determination device. The accuracy of the determination can be improved by providing the soldier with a global positioning system (GPS) that gives the present location of the soldier 202 or the soldier's vehicle (not shown).

The distance-bearing determination is input into a microcomputer either carried with the soldier 202 or mounted within the soldier's vehicle. Depending on the selected method for determining the position of the enemy target 204, the distance determination can be inputted automatically upon measurement, or can be entered manually by the soldier 202. The soldier, in general, will be a trained reconnaissance scout, with the training to determine not only the identity of a particular target, but also its function and general strategic importance. Thus, the soldier 202 will also enter a description of the target, such as an identification of the enemy target 204 (e.g., a type of enemy vehicle), a proposed function of the enemy target (e.g., a re-supply convoy), and any miscellaneous information of interest (e.g., the presence of a high-ranking enemy official). In addition, the soldier 202 can provide a numerical parameter from a predetermined scale indicating of the importance of the target or its perceived threat to friendly forces.

The microcomputer is connected to a database containing geographic data and known positions of friendly forces and targets as part of a FBCB2 (Force 21 Battle Command, Brigade-and-Below), or a similar/successor situational-awareness/battlefield automation and communications system. This location report is assigned a unique identification number, and is formatted to be compatible with the connected database. The position of the enemy target 204 is added to the database, and multicast as a radio signal by a transceiver on the soldier or within his vehicle.

The location report is received by other units on the battlefield (not shown). These other units each possess a database roughly identical to that of the soldier 202. Upon receiving the location report, a microprocessor at each unit updates the database to show the position of the newly-identified target 204. The location report is then re-broadcast to other units, effectively spreading the location report across the theater of operations. By use of these multicasts, the database at each unit is kept roughly identical to maintain a system of common databases across the theater of operations. These common databases will be found with each combat and support unit, as well as in a theater command center 206, a national command center (not shown), and all friendly units within the theater of operations (not shown). Thus, each unit will have information concerning each identified target filed in its computer and database under the appropriate and identical unique identification key, allowing them to communicate efficiently about any particular target.

The location report is eventually received at a theater command center 206, or any similar command post. The theater command center 206 is the main command area within the theater of operations. The theater command will contain a database roughly identical to that of the battlefield units. The database is updated automatically in real-time (as are each of the databases across the entire theater area of operations) to reflect each new location report. The theater command will receive a number of individual location reports over a period of time, each with a unique identification tag. These reports are provided to a target selection system within the command center for determining targets of particular interest. The target selection system can be physically packaged in a variety of ways: as a separate system at a separate location, as a separate system that is co-located with the FBCB2-or-similar-or-successor system, or as a software function that is embedded within the FBCB2-or-similar-or-successor system. It is to be appreciated that other elements of the present invention (e.g., the tracking control system, etc.) can be packaged in a variety of different ways.

The location reports are preprocessed to aid in selecting individual targets of interest. The selection of individual targets can be fully automated or fully manual, but will generally involve a division of function between one or more human operators and a data processing system. Thus, the preprocessing of the location reports can include one or more of formatting the data for display to a human operator, eliminating obviously uninteresting targets based upon predefined parameters (e.g., a threat parameter provided by the locating soldier 202, or a geographic filter), and translating the information provided in the location report to a series of numerical parameters for use in an expert system.

The preprocessed location reports are then evaluated to determine targets of interest. The evaluation can be performed by one or more human operators, one or more expert systems, or a combination of the two, working in conjunction. The selected targets are provided to a tracking system control with their associated identification. In the illustrated embodiment, the tracking system control is located at the theater command 206. Alternatively, the tracking system control could be located at a national command center, at one or more tracking system ground stations (e.g., 208 and 210), or embedded within some other functional grouping.

The tracking system ground stations provide a control component for one or more of a plurality of remote sensor/tracking devices (e.g., 212, 214, and 216). The remote sensor/tracking system ground stations include ground stations associated with theater sensors, which are mobile sensor platforms controlled at the theater of operations, and ground stations associated with national sensors, which are mobile sensor platforms controlled at a remote location. In the illustrated example, a national sensor 212 is located aboard a spacecraft, and two theater sensors (214 and 216) are located aboard a manned and an unmanned aircraft, respectively. It is to be appreciated, however, that ground vehicles, watercraft, unattended ground sensors, and other mobile platforms can be used as part of a remote sensor/tracking system.

A variety of different remote sensor/tracking systems can be used within the closed-loop tracking system of the present invention. In an exemplary application, three basic types of remote sensor/tracking systems are available. Long-range remote sensor/tracking systems, such as spacecraft, are located at a relatively high altitude above the area of interest. These devices have a relatively rigid, predetermined flight plan, and a relatively large tracking range. Where such sensors are moving at orbital altitudes, however, they may (depending on their orbital parameters) pass quickly over an area of interest and cannot track an object for a long period of time. In the illustrated example, the national sensor 212 is a part of a long-range remote sensor/tracking system.

Intermediate remote sensor/tracking systems are located at an intermediate altitude above the area of interest. These devices have a smaller range (and are not available at all times) than the first type, but generally cover a smaller overall area at higher resolution, and most importantly, may have a more flexible flight/movement profile. Thus, the intermediate remote sensor/tracking systems can remain within range of a specified target for a longer period of time. Current examples of intermediate remote sensor/tracking systems include the JSTAR systems, an airborne radar system manufactured by Northrop Grumman Corporation, and GuardRail, an airborne signals intelligence system, also manufactured by Northrop Grumman Corporation. Many other examples exist now, and are planned for the future. In the illustrated example, one of the theater sensors 214, is part of an intermediate-range remote sensor/tracking system.

Finally, short-range remote sensor/tracking systems are located at ground level, or a relatively short distance above ground level. These remote sensor/tracking systems have the shortest range of all, but they are generally not bound to a specific flight plan like the long-range tracking systems, and may often offer even more flexibility in flight profile than the intermediate-range remote sensor/tracking systems. This allows them to follow a specified target for some time, but generally limits them to tracking only one target or a group of associated targets. Example short-range remote sensor/tracking systems include unmanned aircraft, such as the Hunter UAV manufactured by Northrop Grumman Corporation, and ground based reconnaissance units. Other short-range sensors might include devices such as unattended ground sensors, which do not move, but obtain area coverage through the use of a large number of such dispersed units. In the illustrated example, one of the theater sensors 216 is part of a short-range remote sensor/tracking system.

The tracking control system determines an optimal tracking schedule for the plurality of remote sensor/tracking systems, such that each target is tracked over a predetermined interval by one or more remote sensor/tracking systems. The tracking control system operates in accordance with an optimization routine optimally to manage remote sensor/tracking system resources in accordance with one or more user-defined requirements. For example, it may be desirable that no tracking system operate at its full capacity, in order to maintain a flexible tracking capability for newly selected targets. In such a case, the optimization routine might assign a greater "cost" to tracking system resources that are nearing capacity in making its determination. In the illustrated embodiment, the frequent hand-off of targets between tracking systems is discouraged. Thus, in performing the optimization, a premium is placed on selecting tracking systems that can maintain tracking of a target for a significant period of time.

The various types of remote sensor/tracking systems provide significant flexibility in the scheduling process. By way of a simplified example, it might be particularly desirable to use a certain short-range unmanned air vehicle to track a particular target, but the vehicle is out of position and will not be able to acquire the target for a short period of time. Once the vehicle enters range, however, it will be able to track the sensor for a desired interval. A long-range national sensor might also be available that could track the target immediately, but could only maintain the track for a quarter of the desired time. The optimization system could assign the satellite to track the target for the time necessary for the unmanned air vehicle to reach the target, and assign the air vehicle to intercept the target and track it for the remainder of the time. In an exemplary implementation, neither remote sensor/tracking system has to be aware of the presence or the operation of the other remote sensor/tracking system; all hand-offs between sensors are orchestrated by the tracking system control.

During tracking, each remote sensor/tracking system obtains updated position data for its assigned targets. These position data are multicast across the theater of operations under the identification key assigned to the targets to update the positions of the targets within the common databases at all friendly units, including the theater command. Since the same identification key is used by the remote sensor/tracking systems to report updated position reports on this target, all users of the system receive this information as updates to the position of a known target, rather than as duplicate reports concerning this target, or as a target report that is not correlated to any target report that came before it. Personnel seeing the updated information can gain access to the database under the assigned ID to obtain the identity and description of the target from the original location report. In the illustrated example, the position information and location report for a target can be accessed through a graphical user interface. For example, when an icon representing the target moves against a map on a user's display, the user can click on the icon to obtain the available information on the target.

After a predetermined interval, the target selection system will reevaluate the scheduling of the remote sensor/tracking systems for each target in light of this updated position information. The tracking commands to the individual remote sensor/tracking devices will be adjusted and the targets will continue to be tracked until the theater command 206 determines that they are no longer of interest.

Figure 8:
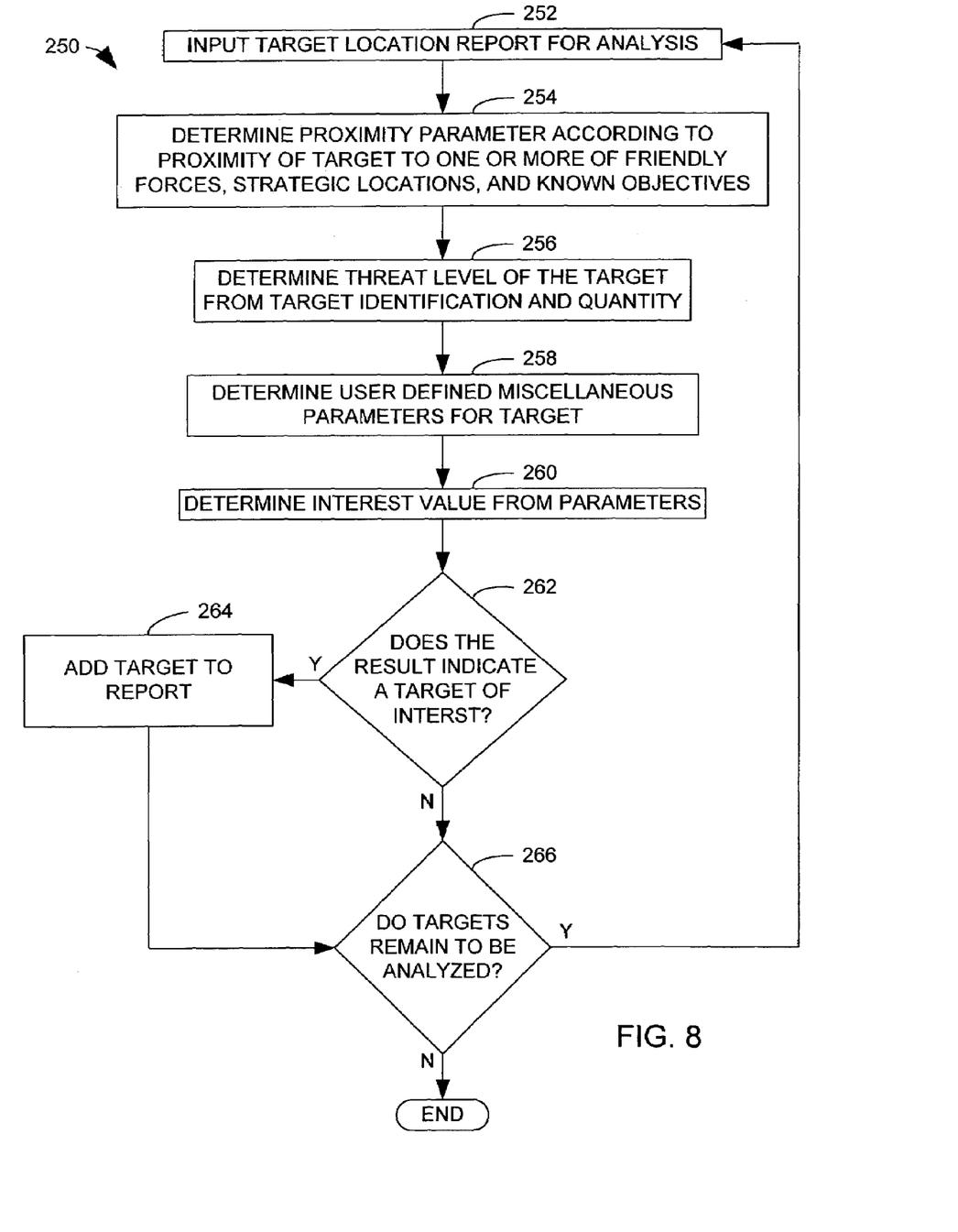
FIG. 8 illustrates an exemplary methodology for selecting a set of targets of interest from a plurality of identified targets in accordance with an aspect of the present invention.

FIG. 8 illustrates an exemplary methodology 250 for selecting a set of targets of interest from a plurality of identified targets. This methodology can be used at the target selector to select one or more targets of interest, but in an exemplary embodiment, this methodology is employed at the target data preprocessor to select a set of targets to be narrowed by a human operator. The methodology begins at 252, where a new target location report is input to the selection system. The location report contains information concerning at least one target characteristic, such as the location, heading, velocity, and identity of the target. In an exemplary embodiment, the location report includes a threat parameter assigned by a reconnaissance scout representing his or her trained determination of the importance of the target.

At 254, a proximity parameter is calculated for the reported target. The proximity parameter indicates the proximity of the target to various points of interest on the battlefield. For example, one factor contributing to the proximity parameter can be the proximity of the target to friendly forces. The proximity of the target to strategic locations can also be factored into the determination. What constitutes a strategic location will vary with the situation and will generally be defined by a human operator. Example strategic locations can include particular cities and towns, bridges, fords, particular areas of elevated terrain, and known enemy installations. It will be appreciated, however, that this list is by no means exhaustive.

A final factor contributing to the proximity parameter is the proximity of the target to known combat objects. For example, if it is intended to send a re-supply convoy through a particular valley, the presence of enemy units on the surrounding hillsides is clearly of interest. The proximity parameter can be expressed as a single scalar parameter, or as several parameters indicating the target's proximity to various points of interest. For example, a set of three proximity parameters might represent the target's proximity to friendly forces, strategic locations, and known objectives.

At 256, a threat parameter is calculated according to the type and quantity of enemy forces comprising the target. This threat parameter will be calculated according to information provided in the location report, such as the type of forces within the enemy target, their apparent function, and the quantity of forces comprising the target. Alternatively, the threat parameter can be provided by the soldier issuing the location report.

At 258, any applicable miscellaneous parameters will be generated by the system. The miscellaneous parameters will be defined by a human operator according to conditions within the theater of operations. For example, it may be desirable at a particular stage of an operation to target enemy officers above a certain rank. In such a case, reconnaissance scouts can be instructed to note the presence and apparent rank of enemy officers when reporting on a discovered target. The miscellaneous parameter could be a set value or could be a function of the reported rank. Alternatively, scouts could be asked to note the presence of indicators that a target is carrying biological or chemical weapons. An appropriate parameter value could be assigned as a flat value where a reconnaissance scout believes such weapons are present or on a scale according to a reconnaissance scout's estimate of the probability that the weapons are present.

At 260, an interest value is determined from the various parameters. This interest value can be determined via any reasonable method including the calculation of a linear combination of the parameters, the evaluation of various non-linear functions of the parameters, or evaluation by a trained expert system. Accordingly, the interest value may be a scalar or a selection by the expert system between one or more discrete threat levels. The method employed can include synergistic effects between the parameters. For example, the presence of biological weapons near friendly forces will result in a considerably greater interest level than the sum of the interest level generated by these factors independently. In an exemplary implementation, an interest level is selected from a plurality of discrete interest levels by a trained expert system.

At 262, it is determined if the interest level indicates a target of interest. If so, the methodology proceeds to 264, where the target is added to a set of targets of interest that will be reported to the tracking control system. The methodology then proceeds to 266. If it is determined that the target is not of interest, the methodology proceeds directly to 266, where it is determined if there are targets remaining to be analyzed. If targets remain for analysis, the methodology returns to 252 to input another location report for analysis. If no targets remain, the process terminates.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A target tracking system comprising:
a target selection system configured to receive a plurality of location reports for a plurality of identified targets, to select at least one target of interest to be tracked from the plurality of identified targets, and to determine a scheduling interval that defines a time period that the at least one target of interest is to be tracked; and
a tracking control system is configured to assign a plurality of tracking systems different time intervals within the scheduling interval for tracking the at least one target of interest, the tracking control system being configured to transmit control signals to the tracking systems with assigned tracking time intervals, such that each control signal directs a tracking system to track the at least one target of interest from a given start time to a given termination time of its associated assigned time interval within the scheduling interval.

2. The system of claim 1, the tracking control system being configured to assign tracking systems different time intervals within the scheduling interval based on a time duration for each tracking system of a plurality of tracking systems in which the tracking system is within tracking range of the at least one target of interest during the scheduling interval.

3. The system of claim 1, where a given one of the plurality of tracking systems is configured to track a plurality targets of interest simultaneously, and the tracking control system is configured to assign different scheduling intervals for each of the plurality of targets of interest, and assign different time intervals within the different scheduling intervals for the given one of the plurality of tracking systems to track each of the plurality of targets of interest.

4. The system of claim 1, each of the plurality of tracking systems having associated tracking ranges and associated predetermined paths of motion, the tracking control system being configured to assign time intervals for tracking the at least one target of interest within the scheduled interval by evaluating the associated tracking ranges and associated predetermined paths of motion of each of the plurality of tracking systems with respect to a location, a velocity and a heading of the at least one target of interest.

5. The system of claim 4, at least one of the associated predetermined paths of motion being an associated flight path of a tracking system.

6. The system of claim 1, the tracking control system periodically receives updated location information from a given tracking system within its assigned time interval that it is tracking the at least one target of interest.

7. The system of claim 6, further comprising a display coupled to the tracking control system, the display being configured to provide graphical updates of the updated location information on the at least one target of interest with respect to at least one of object position data and geographical data.

8. The system of claim 1, further comprising a plurality of tracking systems comprising long-range tracking systems, intermediate-range tracking systems, and short-range tracking systems.

9. The system of claim 8, the long-range tracking systems being spacecraft, the intermediate tracking systems being aircraft, and the short-range tracking systems being at least one of unmanned aircraft, attended ground sensors and unattended ground sensors.

10. The system of claim 1, the target selection system being configured to select at least one target of interest based on an importance parameter of the at least one target of interest.

11. The system of claim 10, the importance parameter of the at least one target of interest including the proximity of the target to at least one defined geographical point of interest.

12. The system of claim 1, further comprising a plurality of locator devices, located remotely from the plurality of tracking systems, that are configured to locate and identify the plurality of identified targets, and transmit location reports to the target selector.

13. The system of claim 12, the plurality of locator devices being configured to assign an identifier to the at least one identified target of interest, the target tracking system being configured to employ the identifier in reporting back tracking information to a requestor in a form suitable for substantially immediate use by the requestor and/or other users.

14. The system of claim 1, a given control signal directing a tracking system to change its path of motion.

15. The system of claim 1, the assignment of the tracking systems to track the at least one target of interest within the scheduling interval defining a tracking schedule, and the tracking control system being configured to determine a plurality of possible tracking schedules for the plurality of tracking systems for tracking the at least one target of interest, assign cost values to each tracking schedule based on characteristics of tracking systems associated with each tracking schedule, and select a tracking schedule with the lowest cost value from the plurality of possible tracking schedules.

16. The system of claim 15, the characteristics of tracking systems associated with each tracking system comprising at least one of tracking ability, tracking capacity, and a duration over which a tacking system can track the at least one target of interest.

17. The system of claim 1, the tracking control system comprising an optimization algorithm configured to assign a different time interval to each of a plurality of tracking systems within the scheduling interval for tracking the at least one target of interest according to a plurality of parameters associated with each of the tracking systems.

18. The system of claim 17, the optimization algorithm comprising at least one of an auction optimization algorithm and a genetic optimization algorithm.

19. The system of claim 1, the tracking control system being configured to assign tracking systems different time intervals within the scheduling interval for tracking the at least one target of interest such that a given target of the at least one target of interest is tracked by one and only one of the plurality of tracking systems at any given time within the scheduling interval.

* * * * *